Aug. 22, 1933.  E. H. ALLEN ET AL  1,923,904
ADJUSTABLE DRAWBAR
Filed Dec. 9, 1932  2 Sheets-Sheet 1

Witness.
H. C. McKnight

Inventors
Edwin Howe Allen
& George H. Connors.
by Burton & Burton
their Attorneys.

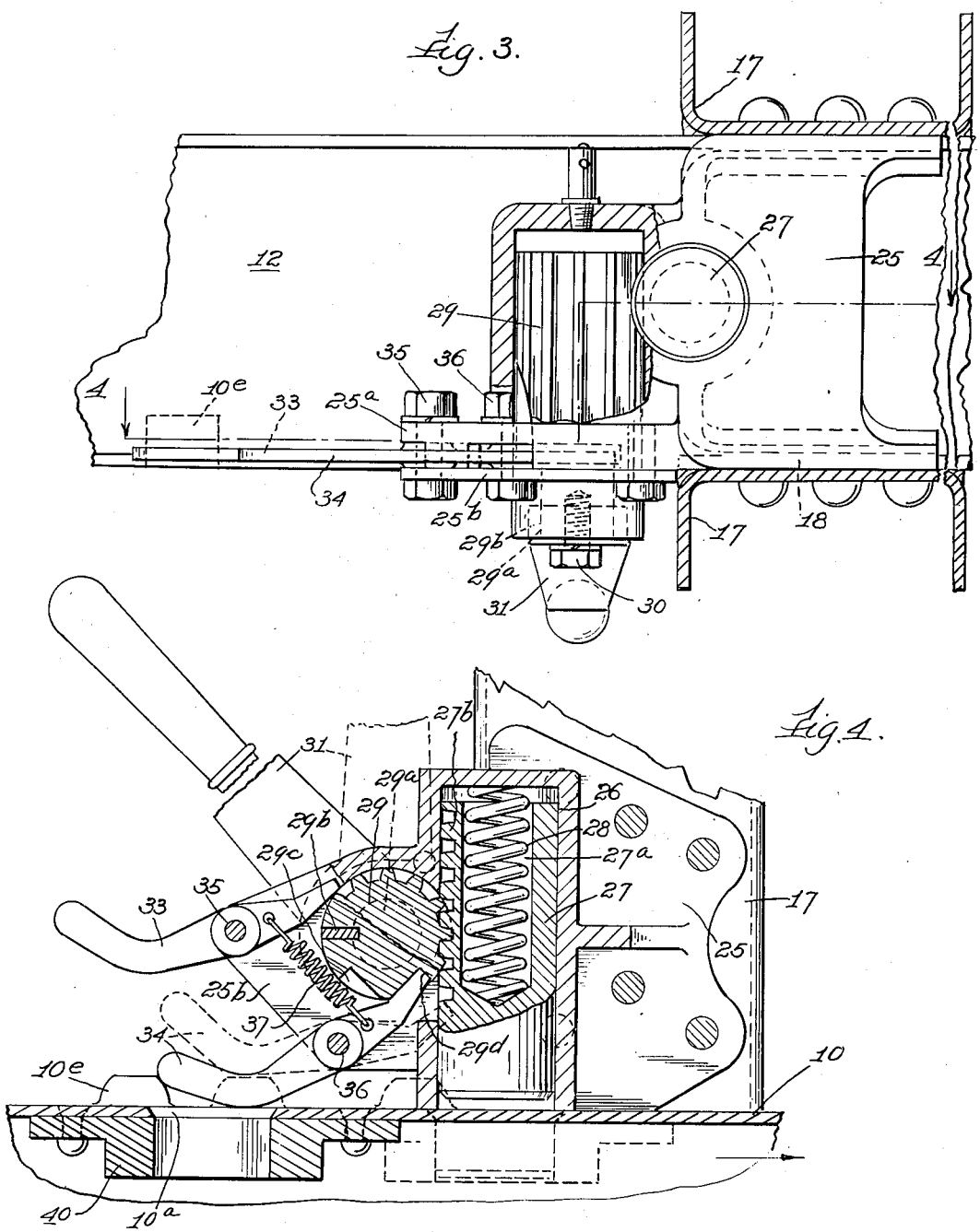

Patented Aug. 22, 1933

1,923,904

UNITED STATES PATENT OFFICE 1,923,904

ADJUSTABLE DRAWBAR

Edwin H. Allen and George H. Connors, Edgerton, Wis., assignors to Highway Trailer Company, Edgerton, Wis., a Corporation of Wisconsin Application December 9, 1932. Serial No. 646,397

8 Claims. (Cl. 280—33.44)

The present invention relates to a draw bar structure for road vehicles such as trailers, and has for its main object to provide an improved construction which permits of quick and easy longitudinal adjustment of the draw bar in a plurality of positions, for varying its effective length. Another object is to provide a novel construction adapted, when adjusted, to automatically lock the draw bar in its various positions of longitudinal adjustment. A still further object of this invention resides in the provision of an improved temporary support for the free end of the draw bar structure. The invention consists in certain features and elements of construction, in combination, as herein shown and described, and as indicated by the claims.

In the drawings:

Figure 3 is a vertical section through the locking device taken at line 3—3 on Figure 1.

Figure 4 is a staggered horizontal sectional view through the locking device, taken at line 4—4 on Figure 3.

The draw bar structure embodying this invention is particularly adapted for use in connection with trailer type road vehicles. Under the laws in various territories, the permissible over-all length of tractor-trailer train combinations has been considerably restricted, necessitating the use of shorter bodies on the trailer vehicles. In order to obtain maximum body capacity and still come within the permissible over-all length of trailer train combination, it is desirable to reduce the space between vehicles to the minimum, thus bringing the bodies in relatively close proximity to each other, with just sufficient clearance therebetween to permit turning corners. Frequently, when tractor-trailer trains are in use off of the main highways, the particular path to be traveled and frequently the special conditions imposed in loading and unloading of the vehicles, necessitates such sharp turns, and the inclinations of the vehicle units with respect to each other may be such that the corners of the bodies are apt to strike against each other. To avoid any damage resulting in such cases, the present invention provides a draw bar structure in which the effective length thereof may be quickly and easily adjusted to a plurality of positions to increase its length, to afford adequate clearance between the bodies of the adjacent vehicles, and, likewise, the draw bar may be quickly reduced in length when the vehicle train is again brought onto the highways.

Figure 1:
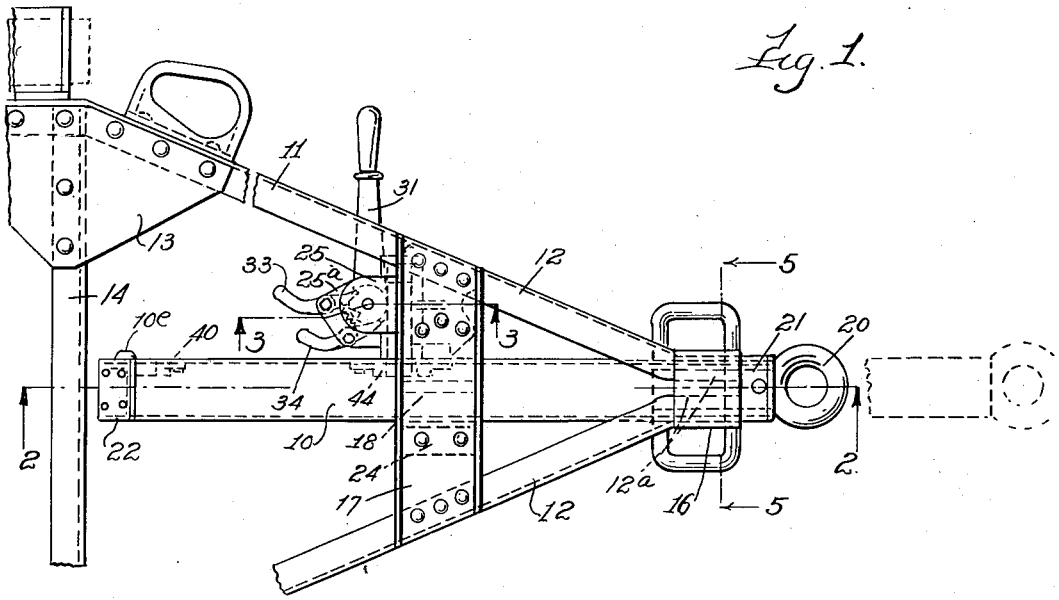
Figure 1 is a plan view of a draw bar structure embodying the present invention.
Figure 2:
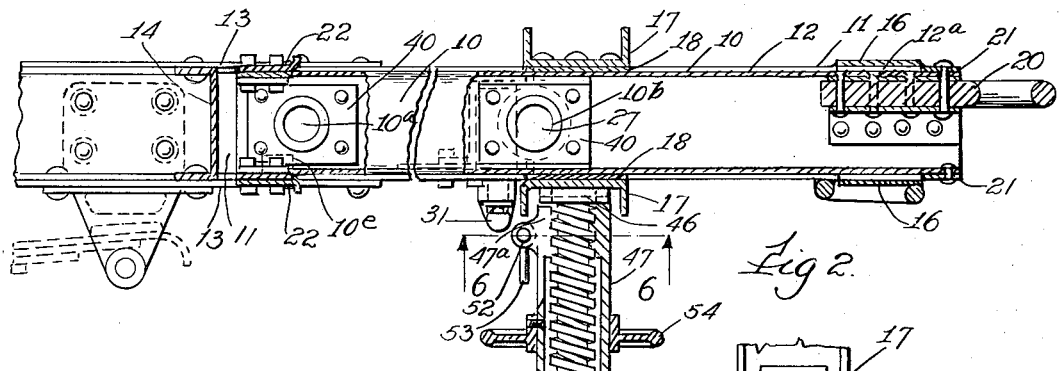
Figure 2 is a vertical longitudinal section taken as indicated at line 2—2 on Figure 1.
Figure 5:
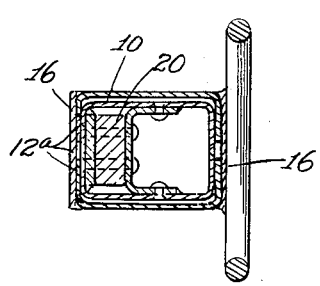
Figure 5 is a transverse section through the forward end of the draw bar, as indicated at line 5—5 on Figure 1.

Referring now in detail to the drawings: The structure embodying this invention consists of a draw bar member indicated at 10, and a frame structure indicated generally at 11. The draw bar frame structure includes a pair of channel side members, 12, having inturned flanges, and the rearward ends of said members are spaced apart and rigidly secured by gusset plates, 13, to the front member, 14, of a swivel "dolly". The channel side members, 12, converge forwardly, with the extreme end portions, 12$^a$, bent in parallel, relatively close, spaced-apart relation, as seen in Figure 1. These end portions, 12$^a$, are rigidly connected at top and bottom by plates, 16, which may be welded in place, thus forming a support and guideway for the draw bar, 10, which is of substantially rectangular, hollow formation. A pair of transversely extending truss members in the form of channels, 17, are secured to the flanges of the side members, 12, intermediate their length. Welded to the inner surface of each of the channel members, 17, as seen in Figure 2, are plates, 18, for engaging the top and bottom surfaces of the draw bar, 10, providing additional support and guidance for the draw bar.

The draw bar structure, which is of hollow formation, has an eyelet member, 20, for connection to a coupler of a draft vehicle, rigidly secured in its forward end in a suitable manner. Rigidly secured on the top and bottom of said draw bar member at the forward end are reinforcing plates, 21, which are adapted to abut against the ends of the terminals, 12$^a$, of the side members, 12, and serve as a stop for limiting the movement of the draw bar when telescoped into the frame structure. And rigidly secured on top and bottom of the rear end of said draw bar are plates, 22, which are arranged to abut against the transverse truss members, 17, to limit the extensibility of the draw bar in its frame, 11.

The draw bar may be adjustable in the frame structure to a plurality of positions for varying its effective length, and for illustration the construction disclosed permits of two positions of adjustment. Rigidly secured between the spaced-apart trusses, 17, at one side of the draw bar is a channel clip, 24, and at the other side of the draw bar there is a housing bracket, 25, having a flat vertical surface, providing guidance for the draw bar against transverse movement. The housing is formed with a hollow cylindrical chamber, 26, extending in horizontal direction, in which is disposed a locking member or plunger, 27, arranged to be projected into either of two horizontally spaced apertures, 10$^a$ and 10$^b$, formed in the adjacent side wall of the draw bar, 10, for locking the latter in fixed position with respect to the frame structure.

The cylindrical plunger, 27, is formed at the outer end with a recess, 27$^a$, in which is disposed a compression spring, 28, reacting against the end wall of the chamber, 26, and normally urging the plunger toward the draw bar. A portion of the surface of the plunger is formed as a toothed rack, indicated at 27$^b$ with which meshes a spur pinion, 29, as seen in Figures 3 and 4. The spur pinion is also encased in the housing, 25, and its lower end is reduced, as indicated at 29$^a$, and journaled in the bearing plate, 25$^b$, secured to the bottom of the housing, 25. Rigidly secured to the lower end of the reduced portion, 29$^a$, of said gear, by means of a key, 29$^b$, is an operating handle, 31, extending laterally of the frame and held in place on said portion, 29$^a$, by a machine screw, 30.

The housing, 25, is formed with a horizontally extending flange or shelf portion, 25$^a$, in spaced relation to the bearing plate, 25$^b$, between which are mounted detents in the form of levers, 33 and 34, carried on pivots, 35 and 36, respectively. The operating ends of these detent levers are urged toward each other by a spring, 37, bringing their extreme ends into contact with the periphery of the lower portion of the spur gear member, 29. This lower surface of the spur gear just above the reduced portion, 29$^a$, is cylindrical, as shown in the staggered section in Figure 4, and in this surface there is provided a pair of notches, 29$^c$ and 29$^d$, with which the ends of the levers, 33 and 34, cooperate respectively. The lever, 34, is adapted to be engaged by a projection, 10$^e$, on the draw bar for automatically locking the draw bar to the frame, as will presently be described. Secured to the inner wall of the tubular draw bar in registration with each of the apertures, 10$^a$ and 10$^b$, for receiving the plunger, 27, are reinforcing bearing plates, 40, which are riveted in position so as to afford a substantial bearing face or abutment shoulder for engagement by the plunger.

The operation of the lock device is as follows: In either position of longitudinal adjustment of the draw bar, 10, the operating lever, 31, is in the position seen in Figure 1 of the drawings, with the plunger, 27, in locking engagement in one of the apertures, 10$^a$ or 10$^b$, and the nose of the detent lever, 33, engaged with the stop shoulder of the notch, 29$^c$. When it is desired to release the locking device to permit increasing or decreasing the effective draw bar length, this trip lever, 33, is first moved out of engagement with its stop shoulder, 29$^c$, and the operating lever, 31, is then swung counter-clockwise to the position seen in Figure 4; such movement of the lever causes rotation of the spur gear, 29, and withdraws the plunger, 27, from the aperture of the draw bar, against the reaction of its spring, 28, and in this position of adjustment of the parts the nose of the detent lever, 34, under the influence of the spring, 37, engages the stop shoulder of notch, 29$^d$, of the spur gear, and thus locks the gear against return movement, and holds the plunger, 27, at inoperative position, as seen in Figure 4. With the parts of the locking device in this position, the draw bar, 10, may be moved to either of its limits of adjustment.

Assuming that the draw bar is to be extended with respect to the position seen in Figure 1 of the drawings, the outer end of the lever, 34, is disposed in close proximity to the draw bar, so that as the bar is pulled forwardly, the lug or projection, 10$^e$, on its side, as seen in Figure 4, will encounter the cam-shaped end portion of the lever, 34, and rock it outwardly so as to shift its nose out of engagement with the stop shoulder, 29$^d$, of the spur gear, and thus the spur gear, with its operating lever, 31, is released, permitting the plunger to be urged outwardly by its spring 28. The plunger thus engages and rides over the smooth surface of the draw bar until the rear aperture, 10$^a$, is registered therewith, at which time the spring, 28, forcibly projects said plunger into locking position for securing the draw bar to the frame structure. Such movement of the plunger causes rotation of the spur gear and its lever to normal position, in which position the nose of the lever, 33, is again caused to snap into engagement with the stop shoulder, 29$^c$, under the influence of the spring, 37. It will also be clear that when it is desired to decrease the length of the draw bar, a similar cycle of operation is followed. That is, the trip lever, 33, is first shifted out of locking position and the lever, 31, rotated to retract the plunger, and the plunger is automatically locked in withdrawn position by the detent or trip lever, 34. Then, when the draw bar is moved rearwardly, the projection, 10$^e$, on the draw bar, again engages the outer portion of the lever, 34, but from the opposite side, and again rocks it about its pivot, 36, shifting its nose out of engagement with the stop shoulder, 29$^d$, thus releasing the spur gear and lever, and placing the plunger under the influence of the spring, 28, so that it rides over the smooth surface of the draw bar until it registers with the aperture, 10$^b$, into which it is forced by the spring in locking relation, rotating the spur gear and lever to normal position, with the trip latch, 33, engaging the stop shoulder, 29$^c$. It will be understood that when only two positions of adjustment of the draw bar are required, the stops, 21 and 22, at the opposite ends of the draw bar, have a further advantage in that they serve to definitely limit its movement at positions of exact registration of the apertures and the plunger for locking action.

This particular construction has a decided advantage in that it is quick and positive in operation, and reduces the possibility of injury to the operator, because, after the trip, 33, and lever, 31, have been manipulated, the operator may step clear of the vehicles so as to insure being out of the path of their wheels, and then the draft vehicle may be moved forward or backward to withdraw or return the draw bar to its other limit of movement, at which position it is automatically locked in place, so that the vehicles are then ready to proceed.

Figure 6:
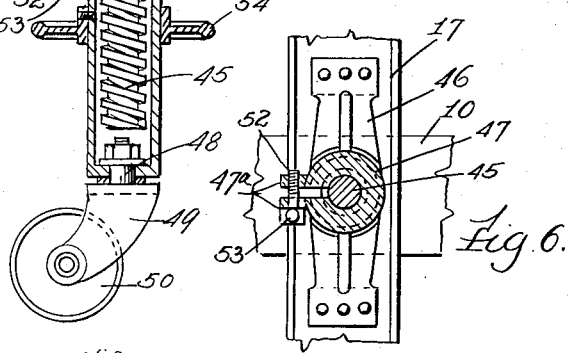
Figure 6 is a transverse view through the temporary supporting leg, taken at line 6—6 on Figure 2.

For tractor-trailer combinations in which semi-trailers are converted into four-wheel trailers by employing "dolly" units, it is desirable to facilitate the coupling and uncoupling of the vehicle units by providing some means for supporting the draw bar structure in proper position when the "dolly" is attached to the semi-trailer, or even when free. For this purpose there is shown a temporary supporting leg, which is secured adjacent the forward or free end of the structure, substantially on the longitudinal center. This temporary support includes a vertically extending screw, 45, rigidly secured by a bracket, 46, to the inner web of the lower channel truss member, 17. Surrounding the screw is a housing or sleeve member, 47, the upper end of which is formed for threaded engagement on the screw, and the lower end of which provides a bearing for the swivel bolt, 48, carrying the caster journal bracket, 49, of the caster wheel, 50. The upper portion of the sleeve or housing, 46, is slotted, as seen in Figure 6, and on the opposite sides of the slot are laterally projecting lugs, 47ª, which are connected by a clamping bolt, 52, having a hand-piece, 53, for conveniently rotating the bolt. It will be understood that the screw, 52, through the lugs, 47ª, serves to draw the lugs toward each other and thereby provides a friction grip on the threads of the screw, 45, for locking the sleeve and swivel wheel at any position of adjustment. A hand wheel, 54, is rigidly secured to the sleeve approximately midway of its length, thus permitting convenient access for readily shifting the sleeve and its swivel wheel up or down.

While there is shown and described herein certain specific structure embodying this invention, it will be manifest to those skilled in the art that various modifications and re-arrangements of the parts may be made without departing from the spirit and the scope of the invention, and that the same is not limited to the particular form herein shown and described, except in so far as indicated by the appended claims.

We claim:

1. In combination, a draw bar frame, a draw bar carried on the frame and longitudinally adjustable relative thereto, and automatic means for locking the draw bar to the frame in a plurality of positions of longitudinal adjustment, said means including a yieldingly actuated, manually releasable locking member, a detent for temporarily holding the locking member in releasing position, and means arranged to disengage the detent in response to longitudinal movement of said draw bar, for permitting said locking member to be moved automatically to locking position.

2. In combination, a draw bar frame, a draw bar carried on the frame and longitudinally adjustable relative thereto, and automatic means for locking the draw bar to the frame in a plurality of positions of longitudinal adjustment, said means including a yieldingly actuated, manually releasable locking member, a detent for temporarily holding the locking member in releasing position, means arranged to disengage the detent in response to longitudinal movement of said draw bar, for permitting said locking member to be moved automatically to locking position, and a yielding detent for positively holding said locking member in locking position.

3. In combination, a draw bar frame, a draw bar carried on the frame and longitudinally adjusted relative thereto, and automatic means for locking the draw bar to the frame in a plurality of positions of longitudinal adjustment, said means including a yieldingly actuated locking member, manually operable means arranged for withdrawing the locking member to release the draw bar, a detent for temporarily holding said means and the locking member in releasing position, and means positioned to disengage said detent in response to longitudinal movement of the draw bar for permitting said locking member to be yieldingly urged to position for locking the draw bar to the frame.

4. In combination, a draw bar frame, a draw bar carried on the frame and longitudinally adjustable relative thereto, and automatic means for locking the draw bar to the frame in two positions of longitudinal adjustment, said means including a yieldingly actuated, manually movable locking member for locking the draw bar to the frame at either position of longitudinal adjustment, a detent for temporarily holding the locking member in releasing position when it has been moved to such position, and means arranged to disengage the detent, when the draw bar is moved toward its other position of longitudinal adjustment, for releasing the locking member and permitting it to be yieldingly urged toward locking position.

5. In combination, a draw bar frame structure, a draw bar carried on the frame and longitudinally adjustable relative thereto, and automatic means on the frame structure for locking the draw bar to the frame structure in a plurality of positions of longitudinal adjustment, said means including a support, a manually withdrawable plunger carried by the support and engageable with abutment shoulders on the draw bar at each of said positions of adjustment, a spring urging the plunger into such locking position, a detent on the support arranged for temporarily holding the plunger in withdrawn position, and a projection on the draw bar positioned to disengage the detent when said draw bar is longitudinally moved, for permitting said plunger to be yieldingly moved toward operative position.

6. In combination, a draw bar frame structure, a draw bar carried on the frame and longitudinally adjustable relative thereto, and automatic means on the frame structure for locking the draw bar to the frame structure in a plurality of positions of longitudinal adjustment, said means including a support, a manually withdrawable plunger carried by the support and engageable in recesses of the draw bar which correspond to the respective positions of adjustment of said draw bar, the surface of the draw bar intermediate the recesses being smooth, a spring yieldingly urging the plunger in locking direction, a detent on the support arranged for temporarily holding said plunger in withdrawn position, and a projection on the draw bar positioned to encounter the detent in response to longitudinal movement of the draw bar, for releasing the plunger before another recess of the draw bar registers therewith, thus causing said plunger to yieldingly engage and ride against the smooth surface of the draw bar until a recess registers therewith.

7. In combination, a draw bar frame structure, a draw bar carried on the frame and longitudinally adjustable relative thereto, and automatic means on the frame structure for locking the draw bar to the frame structure in a plurality of positions of longitudinal adjustment, said means including a support, a manually withdrawable plunger carried by the support and engageable with abutment shoulders on the draw bar at each of said positions of adjustment, said plunger having its surface provided with a toothed rack, a gear carried on the support and meshing with said rack, an operating handle connected to said gear for rotating it to withdraw said plunger from locking engagement with the draw bar, a spring urging the plunger toward locking position, a detent on the support arranged to engage a stop shoulder on said gear when the plunger has been withdrawn, for temporarily holding the plunger in such position, and means on the draw bar adapted when said draw bar is longitudinally moved, to release said detent and permit the plunger to be yieldingly urged toward locking position.

8. In the construction defined in claim 7, a second detent carried on the support and positioned to automatically engage a stop shoulder on the gear when the plunger has moved to locking position, for maintaining it in such position.

EDWIN H. ALLEN.
GEORGE H. CONNORS.